(12) United States Patent
Bird et al.

(10) Patent No.: US 8,556,531 B1
(45) Date of Patent: Oct. 15, 2013

(54) SIMPLE CMC FASTENING SYSTEM

(75) Inventors: Connie E. Bird, Rocky Hill, CT (US); Lisa A. Prill, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 1543 days.

(21) Appl. No.: 11/601,205

(22) Filed: Nov. 17, 2006

(51) Int. Cl.
*F01D 5/02* (2006.01)

(52) U.S. Cl.
USPC .................................. 403/28; 403/29; 403/30

(58) Field of Classification Search
USPC ............... 403/28–30; 60/753, 796; 415/173.3
See application file for complete search history.

(56) References Cited

U.S. PATENT DOCUMENTS

| | | | | |
|---|---|---|---|---|
| 1,745,856 A | * | 2/1930 | Livingston | 337/343 |
| 2,146,461 A | * | 2/1939 | Bettington | 29/512 |
| 2,314,445 A | * | 3/1943 | Du Vall | 411/44 |
| 2,931,532 A | * | 4/1960 | Gapp | 29/509 |
| 3,147,525 A | * | 9/1964 | Texier | 411/44 |
| 3,193,921 A | * | 7/1965 | Kahn | 29/509 |
| 3,295,325 A | * | 1/1967 | Nelson, Jr. | |
| 4,016,718 A | * | 4/1977 | Lauck | |
| 4,263,834 A | * | 4/1981 | Dudash | 411/44 |
| 4,312,599 A | * | 1/1982 | Darolia | 403/29 |
| 4,376,604 A | * | 3/1983 | Pratt et al. | 411/34 |
| 4,411,570 A | * | 10/1983 | Juric | 411/271 |
| 4,614,082 A | * | 9/1986 | Sterman et al. | |
| 4,688,378 A | | 8/1987 | Harris | |
| 4,834,569 A | * | 5/1989 | Foote et al. | 403/30 |
| 4,878,618 A | | 11/1989 | Hufnagel | |
| 5,079,912 A | * | 1/1992 | Cires et al. | |
| 5,228,795 A | * | 7/1993 | Gray | 403/30 |
| 5,228,828 A | * | 7/1993 | Damlis et al. | 415/173.3 |
| 5,285,632 A | * | 2/1994 | Halila | 60/753 |
| 5,333,443 A | * | 8/1994 | Halila | 60/796 |
| 6,397,603 B1 | * | 6/2002 | Edmondson et al. | 60/753 |
| 6,708,495 B2 | | 3/2004 | Calvez et al. | |
| 6,877,952 B2 | * | 4/2005 | Wilson | 415/173.3 |
| 6,895,757 B2 | * | 5/2005 | Mitchell et al. | 60/753 |
| 6,895,761 B2 | | 5/2005 | Mitchell et al. | |
| 7,153,054 B2 | | 12/2006 | Arbona | |
| 7,249,462 B2 | | 7/2007 | Aumont et al. | |
| 7,416,362 B2 | * | 8/2008 | North | 403/30 |

FOREIGN PATENT DOCUMENTS

FR 2825782 A1 12/2002

OTHER PUBLICATIONS

Extended European Search Report for Application No. EP 07 25 4505 dated Jun. 27, 2011.

* cited by examiner

*Primary Examiner* — Victor MacArthur
(74) *Attorney, Agent, or Firm* — Carlson, Gaskey & Olds

(57) ABSTRACT

A simple ceramic matrix composite fastening system that is utilized for attaching components of dissimilar materials, particularly, ceramic matrix composites (CMCs) and metallic engine components. The system is comprised of a detachable subassembly bracket fabricated from metal. The bracket has a metallic engine component attached to one end and a CMC component attached to the other end. The bracket releasably secures the CMC and the metallic component together using rivets or pins, which are inserted into holes through the CMC to securely fasten the adjoining parts.

17 Claims, 1 Drawing Sheet

SIMPLE CMC FASTENING SYSTEM

BACKGROUND OF THE INVENTION

1. Field of the Invention

The present invention relates to an apparatus used to fasten ceramic matrix composites (CMCs) to metallic components.

2. Description of Related Art

Conventional gas turbine engines operate at harsh environmental conditions characterized by high temperatures, high pressures and intense mechanical and acoustic vibrations. Engine manufacturers are in search of new advanced materials that are capable of providing improved durability, greater thrust, longer life, and superior overall performance to replace current state of the art nickel based superalloys. Those skilled in the art of manufacturing engines have identified ceramic matrix composites (CMCs) as having qualities that far surpass the performance capabilities of nickel based superalloys. CMCs can withstand higher temperature conditions, have greater weight reduction capabilities and improved durability over other state of the art materials. CMCs have especially good vibrational damping capabilities and a low coefficient of thermal expansion.

While CMCs do have many advantages, they also present design challenges, especially in their application to hot section engine components. These limitations make it difficult to design fastening systems to attach CMCs to metallic engine components. Most traditional CMCs fastening systems are unable to withstand or dissipate heavy loads and their design often leads to space constraints on the rest of the engine system. One such fastening system uses a combination of screw and rivet technology. This fastening method unavoidably leaves machined holes in the CMC. These holes can result in stress concentrations and increase the likelihood of CMC fracture.

Another method of fastening CMCs to metallic engine components is a CMC self-sealing approach where oxygen entering the engine is consumed in the CMC microcracks. This method prevents access to the carbon matrix interface creating a sealcoat but the sealcoat is prone to degradation. This fastening system does have a high degree of damage tolerance however, it is not enough to sustain the heavy loads and high temperatures that exist during engine assembly.

Accordingly, there is a need for a fastening apparatus that can overcome, alleviate, and/or mitigate one or more of the aforementioned and other deleterious effects of prior art. A novel apparatus is needed that will reduce space constraints, dampen mechanical and acoustic vibrations, compensate for the mismatch in thermal expansion between CMC and metal, and be able to sustain and/or dissipate extreme acoustic, thermal and weight bearing loads that are often not withstandable using traditional apparatuses.

SUMMARY OF THE INVENTION

The present invention provides a simple CMC fastening system that connects CMCs to a non-CMC component. The system has a detachable subassembly bracket that has a slotted configuration with a plurality of holes therethrough. A plurality of fasteners are received through the holes to hold the bracket in place. One end of the bracket is secured to the CMCs via the fasteners and the other end is secured to a non-CMC component.

The above-described and other features and advantages of the present disclosure will be appreciated and understood by those skilled in the art from the following detailed description, drawings, and appended claims.

DETAILED DESCRIPTION OF THE INVENTION

Figure 1:
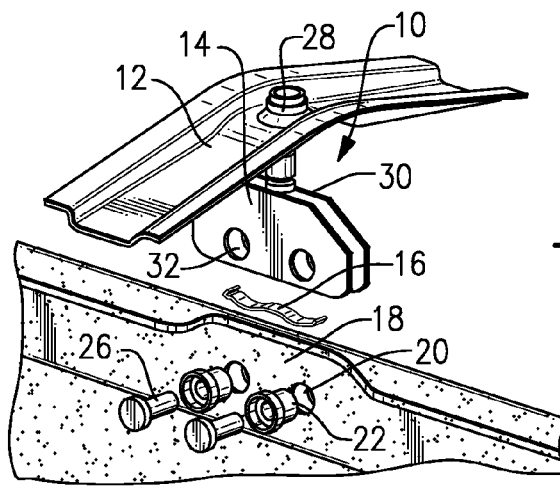
FIG. 1 illustrates a perspective view of the first embodiment of the simple CMC fastening system design of the present invention.

Referring to the drawings and in particular FIG. 1, there is shown the first embodiment of the CMC fastening system of the present invention, generally represented by reference numeral 10. Fastening system 10 has a rigid, slotted bracket 14 that tightly straddles a CMC 18. An opposite end 30 of the bracket is attached to a bridge clamp 12. Bridge clamp 12 is secured to bracket 14 using a nut 28 attached to a threaded post on top of bracket 14. Bracket 14 is preferably fabricated from metal. Bracket 14 may be fastened to CMC 18 using either a single point attachment or a multi-point attachment.

Bracket 14 and CMC 18 have a plurality of apertures 32 and 20, respectively, through which a plurality of rivets 26 are inserted to function as fasteners. Apertures 32 and 20 are elongated in shape which allows for axial expansion of the system overall.

Rivets 26 are inserted through bracket apertures 32 and CMC apertures 20. Rivets 26 function as fasteners that securely connect bracket 14 to CMC 18 and hold bracket 14 in position. Preferably, rivets 26 are flared end rivets to minimize the stress induced in the bracket and CMC apertures that would occur if a regular rivet were used. A regular rivet would expand after installation to fill the hole, and damage the CMC. The flared end rivet functions more like a pin, and secures the hardware without adding the extra stress that a traditional rivet would. Alternatively, rivets 26 may be substituted with pins that would also function to securely connect bracket 14 to CMC 18 and hold bracket 14 in position.

Rivets 26 may be installed inside of a plurality of optional sleeves 22 before being inserted into bracket apertures 32 and CMC apertures 20. The function of sleeve 22 is to prevent any stress or damage from being induced in the edges of CMC apertures 20.

A leaf spring 16 is inserted at the point where bracket 14 and CMC piece 18 converge. The purpose of leaf spring 16 is to dampen mechanical vibrations and to compensate for slack induced due to clearance between the mating parts. The leaf spring 16 impinges directly upon the CMC piece and the bracket 70 (see FIG. 3).

Figure 2:
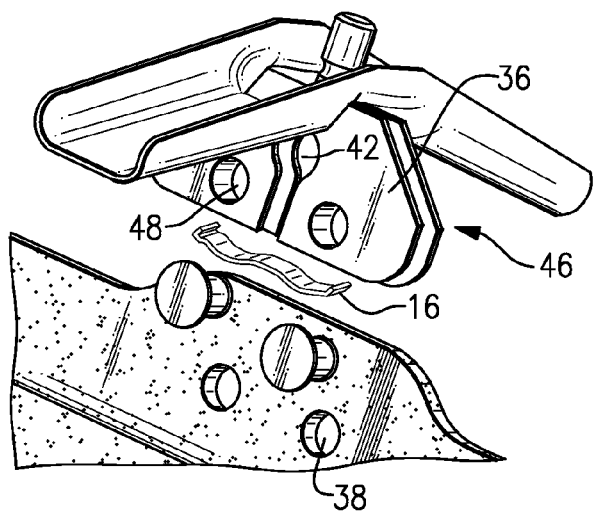
FIG. 2 illustrates a perspective view of the second embodiment of the simple CMC fastening system design of the present invention using a compliant bracket.

FIG. 2 illustrates a second embodiment of the present invention generally shown by reference numeral 46. Elements of the first embodiment are substantially identical to the second embodiment except where indicated. The second embodiment of the CMC fastening system has an alternative bracket design 36. Bracket 36 is a compliant bracket that has a vertical gap 42 which allows bracket 36 to flex. The flexibility allows a plurality of apertures 38 in the CMC and a plurality of apertures 48 in the bracket to line up when the parts are hot. Compliant bracket 36 reduces the impact of the differences in coefficients of thermal expansion of the CMC and the metal bracket. If the metal bracket and the CMC are at the same temperature, the distance between the apertures in the bracket will increase more than the distance between the apertures in the CMC and therefore, can induce stress into the CMC.

If the bracket is very compliant, apertures 38 in the CMC and apertures 48 in the bracket can be round in shape. If the bracket is moderately compliant, apertures 38 in the CMC and apertures 48 in the bracket can be elongated as in the first embodiment, but the degree of elongation will be less than in the first embodiment because of the compliant design of bracket 36.

Figure 3:
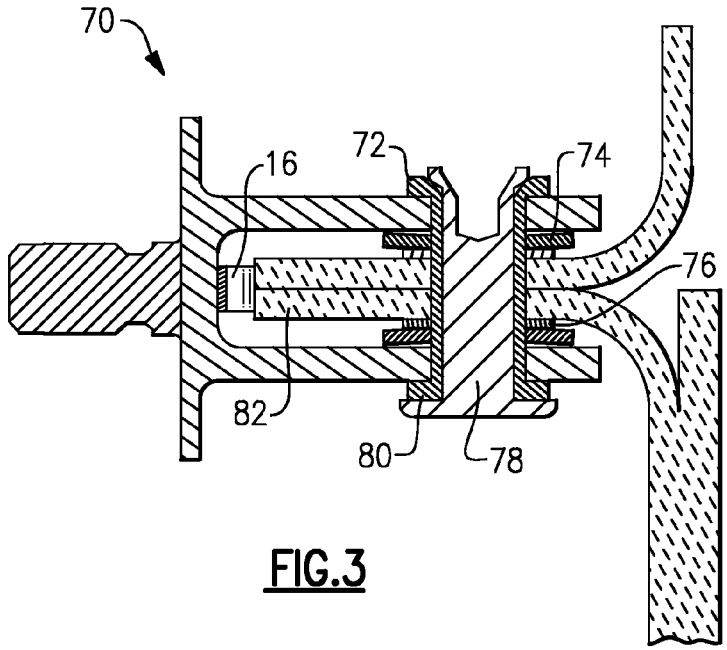
FIG. 3 illustrates a cross sectional view of the simple CMC fastening system of the present invention.

FIG. 3 illustrates a cross sectional view of the CMC fastening system of the present invention, generally represented by reference numeral 70. Fastening system 70 has a first sleeve 80 and a second sleeve 72 that capture a single flare end rivet 78. Alternatively, rivet 78 may be a standard rivet or a double countersunk rivet. A Belleville washer 74 and a washer/shim 76 may be used on one or both sides of a CMC rib 82 to maintain a tight fit during engine operation.

Both the first and second embodiments of the CMC fastening system may require additional parts if there is a substantial discrepancy between the coefficient of thermal expansion of the CMC and the metallic engine component attachment. The fastening system can achieve thermal expansion using a spring if necessary. Any such discrepancy upon expansion of the metal when the CMC does not expand along the length of the rivet can be compensated for using additional springs, such as a Belleville washer(s) or wave springs. The Belleville washer can be placed between the nut and the feature to maintain when the parts thermally expand. The washer can serve the additional purpose of reducing the stiffness of the fastener assembly to minimize CMC stress that tends to build because of thermally induced tightening of the assembly.

Both embodiments of the CMC fastening system and of the current invention may use either a single or multi-point attachment, although a single point attachment would not use a compliant bracket. Single point attachment is preferred where the load bearing capability of the material is above the applied load. In the case of a multi-point attachment, a design feature can be added that allows compliance as needed. If a single point attachment is utilized and rotational freedom is required, the springs may be adjusted in size or eliminated entirely, depending on the specification requirements.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the invention without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. An apparatus for fastening a ceramic matrix composite (CMC) to a non-ceramic matrix component, said apparatus comprising:
    a detachable subassembly bracket having a configuration with a plurality of apertures therethrough;
    a plurality of fasteners receivable through said apertures; and
    a spring; said spring adapted to be inserted in a slot between said bracket and said ceramic matrix composite; said spring capable of dampening vibrations,
    wherein said bracket has a first end that is adapted to be in direct contact with the ceramic matrix composite via said fasteners and has a second end that is adapted to be secured to the non-ceramic matrix component.

2. The apparatus of claim 1, wherein said plurality of apertures are adapted to be in registration with a plurality of apertures in said ceramic matrix composite.

3. The apparatus of claim 2, wherein said plurality of fasteners are a plurality of rivets; said rivets are adapted to be inserted into said apertures in the ceramic matrix composite and said apertures in the bracket to releasably fasten the ceramic matrix composite to the bracket.

4. The apparatus of claim 3, wherein said rivets are adapted to be installed inside of a sleeve prior to being inserted through the apertures in the ceramic matrix composite.

5. The apparatus of claim 3, wherein said rivets are single flare end rivets.

6. The apparatus of claim 1, wherein said non-ceramic matrix component is metallic.

7. The apparatus of claim 1, wherein said bracket has a bridge clamp mechanism connected thereto.

8. The apparatus of claim 1, wherein said plurality of apertures through said bracket are elongate or round in shape.

9. The apparatus of claim 1 wherein said spring is a wave spring.

10. An apparatus for fastening a ceramic matrix composite (CMC) to a metallic engine component, said apparatus comprising:
    a detachable subassembly bracket having a configuration with a plurality of apertures and a slot therethrough;
    a plurality of fasteners receivable in said apertures and through said slot; and
    a spring; said spring adapted to be inserted in said slot between said bracket and said ceramic matrix composite; said spring capable of dampening vibrations,
    wherein said bracket is adapted to be received by said ceramic matrix composite in said slot at one end; said ceramic matrix composite adapted to be secured to said bracket via said plurality of fasteners; said bracket being adapted to be secured to the metallic engine component at an opposite end.

11. The apparatus of claim 10, further comprising a plurality of apertures that are adapted to be aligned through apertures in said ceramic matrix composite.

12. The apparatus of claim 10, wherein said plurality of fasteners are a plurality of single flare end rivets; said rivets being receivable in said apertures through said bracket and said apertures through said ceramic matrix composite to releasably fasten said bracket to said ceramic matrix composite.

13. The apparatus of claim 12, wherein said rivets are adapted to be installed inside of a sleeve prior to being inserted through the apertures in the ceramic matrix composite.

14. The apparatus of claim 10, wherein said bracket has a bridge clamp mechanism connected thereto.

15. The apparatus of claim 10, wherein said apertures through said bracket are elongate or round.

16. The apparatus of claim 10 wherein said spring is a wave spring.

17. An apparatus for fastening a ceramic matrix composite (CMC) to a metallic engine component, said apparatus comprising:
    a detachable subassembly bracket having a configuration with an aperture and a slot therethrough;
    a fastener receivable in said aperture and through said slot; and
    a spring; said spring adapted to be inserted in said slot between said bracket and said ceramic matrix composite; said spring capable of dampening vibrations, wherein said bracket is adapted to be received by said ceramic matrix composite in said slot at one end; said fastener is adapted to secure said ceramic matrix composite in said bracket thereby; and said bracket being adapted to be secured to the engine component at an opposite end thereof.

* * * * *